United States Patent
Cain et al.

(10) Patent No.: US 7,253,740 B2
(45) Date of Patent: Aug. 7, 2007

(54) METHOD AND APPARATUS FOR MONITORING FOR FAILURE TEMPERATURES OF A STRUCTURE

(75) Inventors: Russell P. Cain, Columbia, MD (US); Bliss G. Carkhuff, Laurel, MD (US); Andrew M. Lennon, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 255 days.

(21) Appl. No.: 11/070,454

(22) Filed: Mar. 2, 2005

(65) Prior Publication Data

US 2006/0199003 A1    Sep. 7, 2006

(51) Int. Cl.
*G08B 7/06* (2006.01)

(52) U.S. Cl. ............... 340/596; 340/584; 340/590; 340/594; 340/638; 340/652; 340/653

(58) Field of Classification Search ............... 340/584, 340/590, 594, 596, 638, 652, 653
See application file for complete search history.

(56) References Cited

U.S. PATENT DOCUMENTS 3,555,531 A * 1/1971 Montone ............... 340/594
3,774,184 A * 11/1973 Scarelli ............... 340/590
4,159,447 A 6/1979 Gernhardt et al.
4,388,267 A * 6/1983 Tokarz ............... 376/247
4,520,352 A * 5/1985 Domingue ............... 340/590
5,185,594 A 2/1993 DeChurch
5,425,274 A 6/1995 Creager
5,969,260 A 10/1999 Belk et al.

* cited by examiner

*Primary Examiner*—Jeffery Hofsass
*Assistant Examiner*—Samuel J. Walk
(74) *Attorney, Agent, or Firm*—Albert J. Fasulo, II (57) ABSTRACT

An apparatus for monitoring a temperature of a structure, comprising: one or more electrically conductive loops adapted to be affixed to the structure, each including first and second elongate connection strips each made of a first metal composition having a first melting point, and a temperature sensitive band connected between the first and second connection strips and made of a second metal composition having a second melting point less than the first melting point. The apparatus further comprises a monitor, connected to respective ends of the first and second connection strips spaced-apart from the temperature sensitive band, configured to detect an open-circuit in the one or more electrically conductive loops caused when the temperature sensitive band separates from either of the connection strips.

26 Claims, 8 Drawing Sheets

FIG. 1a

FIG. 1b
(Front View)

Figure 9 - Creep strain of steel tested in tension

METHOD AND APPARATUS FOR MONITORING FOR FAILURE TEMPERATURES OF A STRUCTURE

CROSS-REFERENCE TO RELATED APPLICATIONS

This application relates to U.S. Provisional Application Ser. No. 60/501,191, filed Sep. 8, 2003, which is incorporated herein by reference in its entirety.

BACKGROUND OF THE INVENTION

1. Field of the Invention

The present invention relates to techniques for monitoring a temperature of a structure.

2. Background

A large multi-story building is supported by a complex support structure. The support structure includes many interconnected support members, such as metal beams and trusses. Sufficiently high temperatures caused by fire can breach the structural integrity of a metal beam and truss, and as a result, the integrity of the support structure as a whole. Whereas fire-heated portions of the support structure may survive a fire due to redistribution of heat to surrounding cooler portions, localized failure of metal beams or trusses can lead to a disastrous failure of the overall structure. The 9/11 World Trade Center disaster is an example where such localized structural failure lead to a complete and catastrophic failure of the entire supporting structure. Accordingly, there is a need to monitor for (that is, detect and report) dangerously high localized temperatures in a support structure before such temperatures can cause the structure to fail. In the event such a high temperature is detected, there is a related need to indicate where in the structure the high temperature is located. Also, there is a need to implement and perform such localized monitoring in an efficient, simple, and cost effective manner, given the massive size and large number of multi-story support structures.

SUMMARY OF THE INVENTION

Embodiments of the present invention satisfy the above-mentioned and other needs. An embodiment of the present invention includes an apparatus for monitoring a temperature of a structure, comprising: one or more electrically conductive loops adapted to be affixed to the structure, each including first and second elongate connection strips each made of a first metal composition having a first melting point, and a temperature sensitive band connected between the first and second connection strips and made of a second metal composition having a second melting point less than the first melting point. The apparatus further comprises a monitor, connected to respective ends of the first and second connection strips spaced-apart from the temperature sensitive band, configured to detect an open-circuit in the one or more electrically conductive loops caused when the temperature sensitive band separates from either of the connection strips.

Further method, system and apparatus embodiments are apparent from the description below.

BRIEF DESCRIPTION OF THE DRAWINGS

Various embodiments are described below with reference to the drawings.

DETAILED DESCRIPTION OF THE PREFERRED EMBODIMENT(S)

Figure 1A:
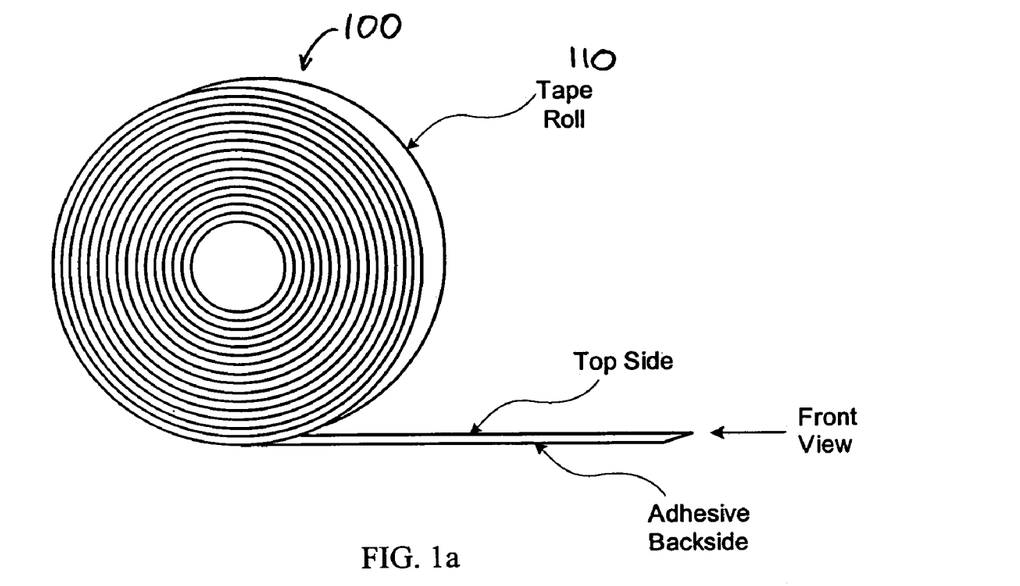
FIGS. 1a, 1b and 1c are illustrations of different views of a temperature monitoring tape constructed in accordance with an embodiment of the present invention, the tape having a first configuration (configuration A) of conductive traces deposited thereon as depicted in FIGS. 1b and 1c.
Figure 1B:
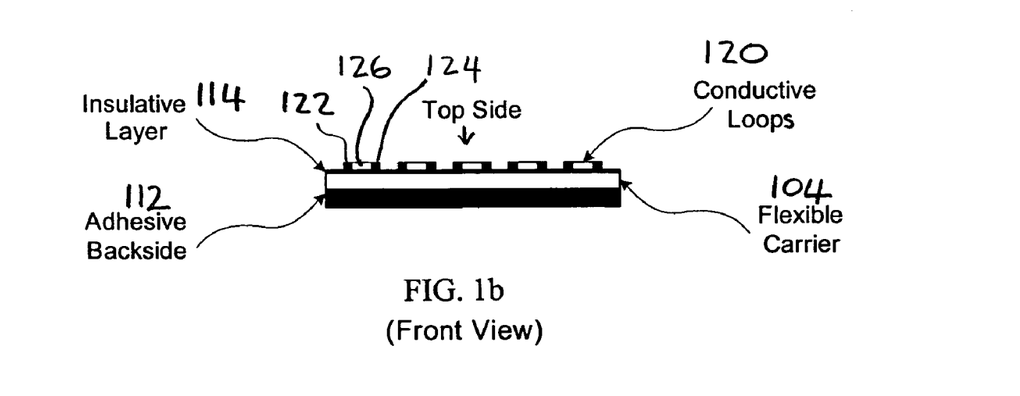
Figure 1C:
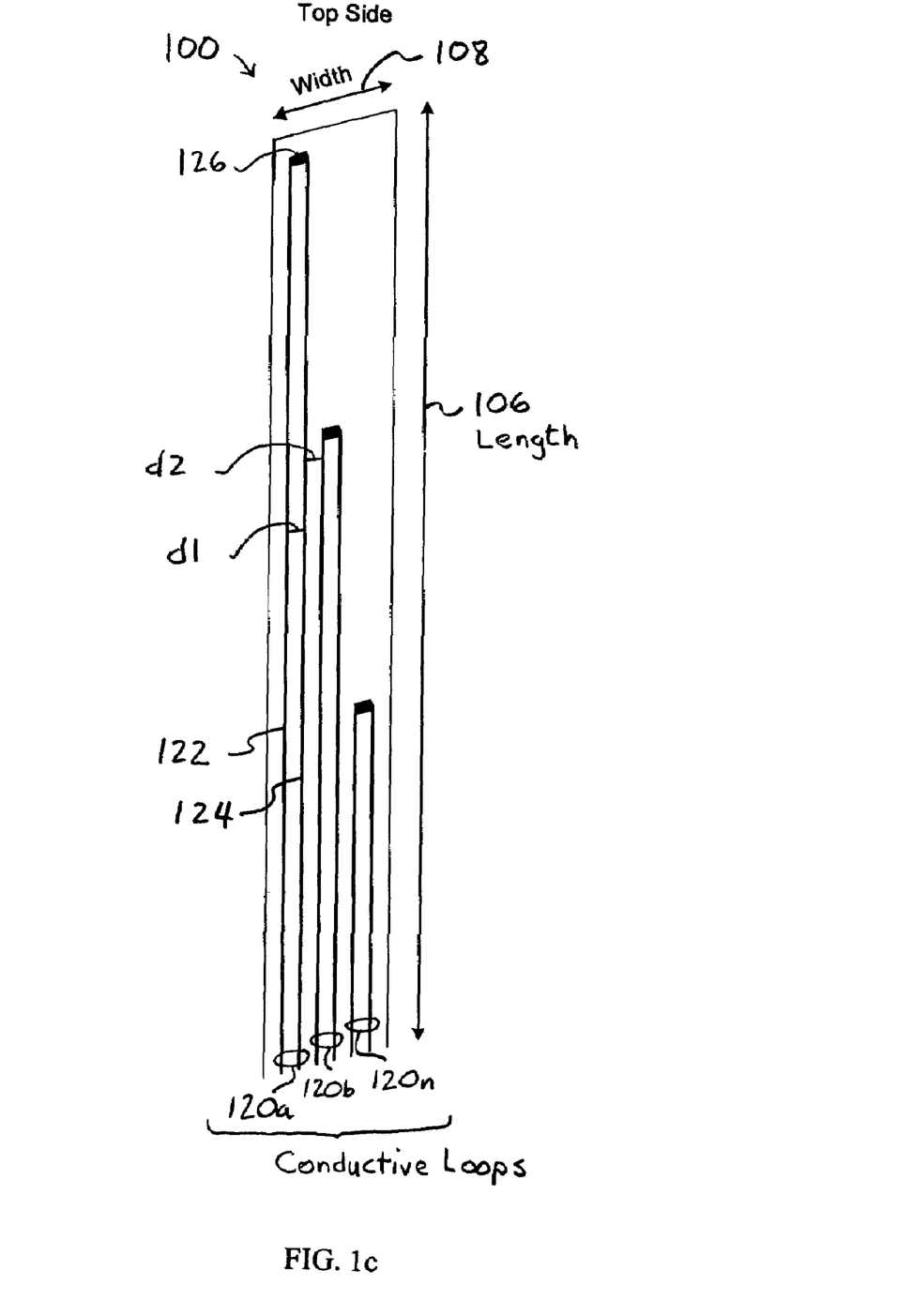

Depicted in FIGS. 1a, 1b and 1c are different views of a temperature monitoring tape 100 constructed in accordance with an embodiment of the present invention. In an exemplary use, tape 100 is affixed to a structural support of an edifice (not shown in FIGS. 1a-1c) to monitor the temperature of the support, in a manner to be described more fully below. Tape 100 includes a flexible carrier 104 having a length 106 (FIG. 1c) substantially greater than a width 108 of the carrier. A typical width is between 0.75 and 8 inches, but other widths may be used in the present invention. Carrier 104 can be wound into, stored as, and dispensed from a roll 110 (FIG. 1a). In an embodiment, a pressure-sensitive adhesive layer 112 (FIG. 1b), affixed to a back side of flexible carrier 104, can be pressed against and thereby affixed to the structural support that is to be monitored.

Known tapes having suitable carrier and adhesive layers include: adhesive Silicaflex™ Tape AB, rated for (i.e., which remains structurally sound at) temperatures at 982° C., from Insulflex®; aluminum tape rated for temperatures up to 659° C.; and copper tape rated for temperatures up to 1084° C.

In an alternative embodiment, adhesive layer 112 is omitted. In such an embodiment, flexible carrier 104 can be affixed to the structural support using glue, epoxy, paint or any other material suitable for adhering carrier 104 to the structural support.

Tape 100 also includes an electrically insulating layer 114 (FIG. 1c) overlaying, and in the embodiment depicted in FIG. 1c, affixed to, and across, a top side of carrier 104. Electrically insulating layer 114 can be made of an electrically insulating metal oxide or paint, such as a high-temperature manifold paint. If a metal tape carrier is used, then an oxide of the carrier metal can be used as electrically insulating layer 114.

Tape 100 also includes multiple electrically conductive loops or channels 120a-120n (FIGS. 1b, 1c) overlaying, and in the embodiment depicted in FIG. 1, affixed to, insulating layer 114. In the embodiment of FIG. 1c, each of channels 120 includes the following electrically conductive traces: an elongated first connection strip 122; an elongated second connection strip 124; and, a relatively short temperature sensitive band 126 connected between connection strips 122, 124. The full length of carrier 104 can be fed through a deposition system that deposits conductive traces 122-126 on insulating layer 114 along the full length of carrier 104. The conductive traces may be deposited on insulating layer 114 using sputtering, plating, painting, printing, a combination thereof, or any other know deposition technique. A typical thickness of the electrically conductive traces is about 5 mils, but other thickness may be used. In other embodiments, tape 100 may include additional layers of metallization, insulation, and supporting carriers.

Connection strips 122, 124 are spaced apart from one another by a distance d1 (e.g., about 10 mils, but other distances can be used) across width 108 of carrier 104, so as to extend substantially parallel to one another along the length of carrier 104. Connection strips 122, 124 are each made of a first metal composition having a first, relatively high-temperature, melting point. Connection strips 122, 124 may be made of an aluminum composition (e.g., aluminum) or alternatively a copper composition (e.g., copper) having respective melting points near 659° C. and 1084° C. Alternatively, connection strips 122, 124 may be paints having silver, platinum, or nickel compositions, having respective melting points near 961° C., 1772° C. or 1453° C. The example compositions of connection strips 122, 124 give a melting point range above about 650° C. (in an example, above a mechanical failure/deformation temperature of 650° C. for a steel beam under mechanical load; see FIG. 9 and its accompanying description below), and more specifically, in the range of about 650° C. up to about 1800° C.

Temperature sensitive band 126 (also referred to as band 126) is made of a second metal composition different from the metal composition of connection strips 122, 124 and having a second, relatively low-temperature, melting point that is substantially less than the first melting point. As an example, temperature sensitive band 126 may be made of a zinc alloy having a melting point near 410° C., a lead composition having a melting point near 328° C., or a tin composition having a melting point near 232° C. The example compositions of band 126 give a melting point range from about 200° C. up to about 450° C. For the aforementioned examples, the metal compositions of band 126 and connections strips 122, 124 are such that the melting point of band 126 is at least approximately 200° C. (i.e., 650° C.-450° C.=200° C.) less than the melting point of connection strips 122, 124.

In an embodiment, the composition of band 126 is selected to have a relatively-low melting point near, preferably below, a critical failure temperature of a mechanically loaded support member to which the band is to be affixed. That is, the relatively-low melting point of band 126 is preferably matched to the critical failure temperature of the support member. Factors used in selecting an appropriate temperature sensitive band metal composition, and thus melting point, matched to a support member critical failure temperature are described below in connection with FIG. 8.

In the embodiment of FIG. 1c, each of conductive loops 120 extends along carrier length 106 and is separated from each adjacent conductive loop by a distance d2 (e.g., about 10 mils, but other separations can be used) across width 108 of the carrier. Conductive loops 120 are electrically isolated from each other and run substantially parallel to each other along carrier length 106. Conductive loops 120 have respective lengths graduated along carrier length 106 such that their respective temperature sensitive bands 126 are spaced apart from each other along carrier length 106. Thus, spaced temperature sensitive bands 126 have predetermined positions on carrier 106.

When the temperature of tape 100, and thus conductive loops 120 deposited thereon, is below the relatively low-temperature melting point, connection strips 122, 124 and temperature sensitive band 126 for each conductive loop 120 form a continuous electrical circuit. However, as the temperature rises to a level near the relatively low-temperature melting point, temperature sensitive band 126 tends to melt and thereby separate from either of connection strips 122, 124. Such separation causes an electrical open-circuit in the corresponding conduction loop 120. Thus, the open-circuit indicates that tape 100 is at or above the relatively low-temperature. In this manner, temperature sensitive band 126 operates as a temperature "fuse" that fails at or above the relatively low temperature. In an embodiment, wicking of melted band 126 to insure an open-circuit can be facilitated by either an absorbent material of through geometric shaping. Although the amount of melted metal is small, such wicking would also insure adjacent loops would not be shorted.

Figure 2:
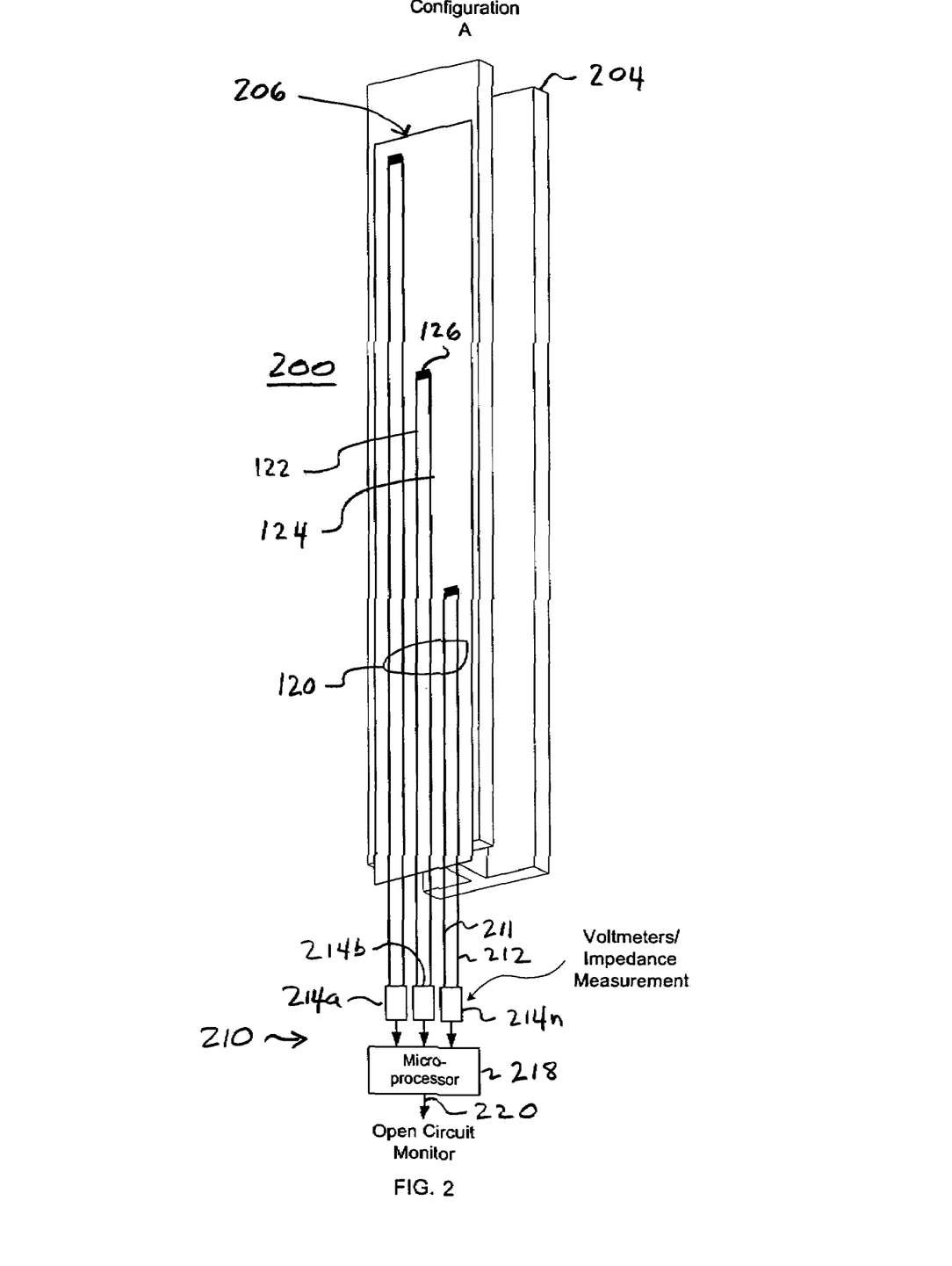
FIG. 2 is a blocked diagram of an example apparatus or system using the tape of FIGS. 1a-1c for monitoring the temperature of a structural support.

FIG. 2 is a blocked diagram of an example apparatus or system 200 for monitoring the temperature of a structural support 204, such as one or more I-beams or other steel, iron and/or concrete girders, for example. Typically, structural support 204 forms part of an edifice support structure. Apparatus 200 includes a strip or segment 206 of tape 100 having its adhesive back side 112 affixed to and along the length of I-beam 204, such that conductive channels 120 extend, and their temperature sensitive bands 126 are spaced apart, along the length of the I-beam. This arrangement positions bands 126 at predetermined locations along I-beam 204. Segment 206 may be affixed to I-beam 204 either beneath or on top of paints, insulating materials, concrete or any other coatings applied to the I-beam. Although only a single I-beam is depicted in FIG. 2, it is contemplated that one or more tape strips 206 may be applied in series to multiple beams of a super-structure to be monitored.

Apparatus 200 also includes an example monitor 210 electrically coupled to each of channels 120 and configured to monitor the channels for open-circuits therein. Monitor 210 includes multiple circuit testers 214a-214n each configured to monitor for, or detect, an open-circuit in a corresponding one of channels 120a-120n. Each tester 214 is electrically connected to ends 211, 212 of connection strips 122, 124 of a corresponding conductive loop. The positions of bands 126 along I-beam 204 are known. That is, the distance between ends 211, 212 and temperature sensitive band 126 is assumed to be known for each channel 206. This apriori knowledge is useful in specifically locating failed temperature sensitive bands along and among structural supports, and thereby identifying the location of failures in an edifice supported by those structural supports monitored by the present invention. In addition, the compositions of bands 126 are selected such that their melting points are indicative of failure temperatures of the structures to which the bands are attached. This is described more fully below in connection with FIG. 9.

In an embodiment, circuit tester 214 operates as a continuity tester that applies a signal to end 211 and monitors for an absence of the signal at the other end 212. An absence of the signal at end 212 indicates an open-circuit caused, for example, when temperature sensitive band 126 melts and thus separates from connection strips 122, 124, as mentioned above. Circuit testers 214 can be known impedance or resistance measurement devices, or voltmeters. In another embodiment, each tester 214 includes a known time domain reflectometer (TDR).

Each individual circuit tester 214 provides to a controller 218 a signal indicative of whether an open-circuit exists, i.e., a failure has occurred, in the corresponding monitored channel. In response, controller 218 provides a signal 220 indicating whether any open-circuit condition exists, and if so, the identity of the failed channel(s). Assuming an open-circuit results from a failed temperature sensitive band, and that the positions of the temperature sensitive bands are known, the identity of a failed channel indicates the position of a dangerous hot-spot in the edifice. Assuming bands 126 melt/fail near the critical failure temperature(s) of the structure (e.g., beam 204), the present invention detects when the structure may be near its failure temperature. Thus, the present invention operates as a monitor of the structural integrity of the structure when the structure is under heat loading, that is, when the temperature of the structure is raised, for example, by fire.

Given the range of metallization and tape width dimensions described above, a given tape 100 may have hundreds or even thousands of channels 120 deposited across its carrier. This large number of channels can be useful for monitoring large support structures, in the manner described below in connection with FIG. 8, for example. A given tape or single tape strip may run a length of several hundred or even thousand feet, and thereby be capable of monitoring long lengths of support structure. Many strips may be used to monitor miles of support structure, inexpensively.

Figure 3:
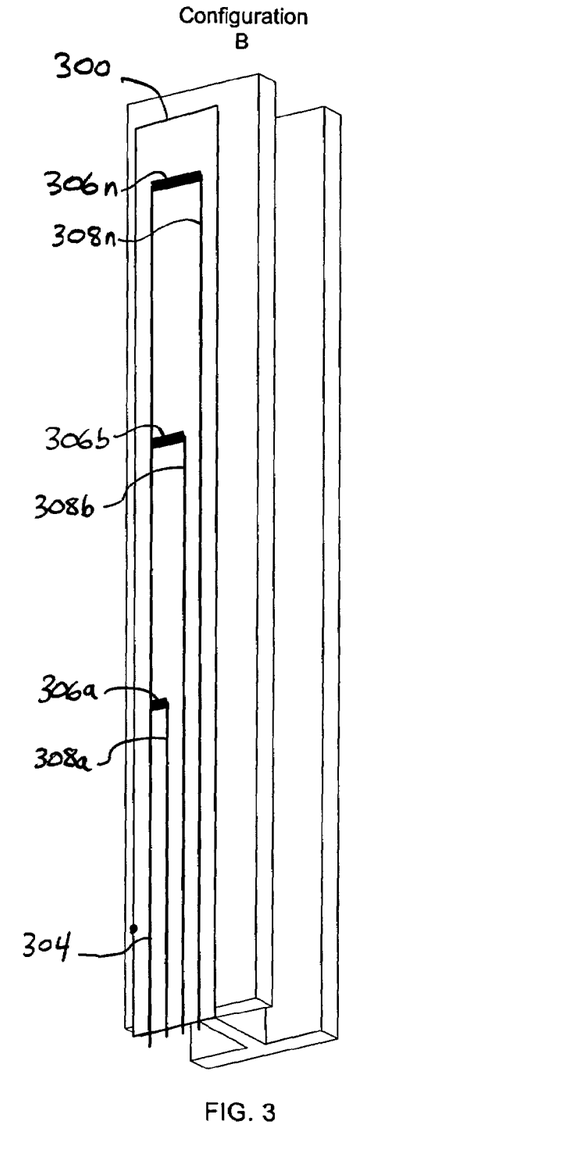
FIG. 3 is an illustration of a temperature monitoring tape having a second configuration (configuration B) of conductive traces deposited thereon.

FIG. 3 is a diagram of another arrangement 300 of the electrically conductive traces deposited on tape 100. The conductive traces of arrangement 300 include a common first connection strip 304 (corresponding to connection strip 122 in FIG. 1c) extending along carrier length 106. Arrangement 300 includes multiple temperature sensitive bands 306a-306n (corresponding to band 126 in FIG. 1c) respectively connected to common connection strip 304 at graduated positions along carrier length 106. Arrangement 300 also includes multiple second connection strips 308a-308n (corresponding to connection strip 124 in FIG. 1c) each connected to a respective one of temperature sensitive bands 306a-306n.

Figure 4:
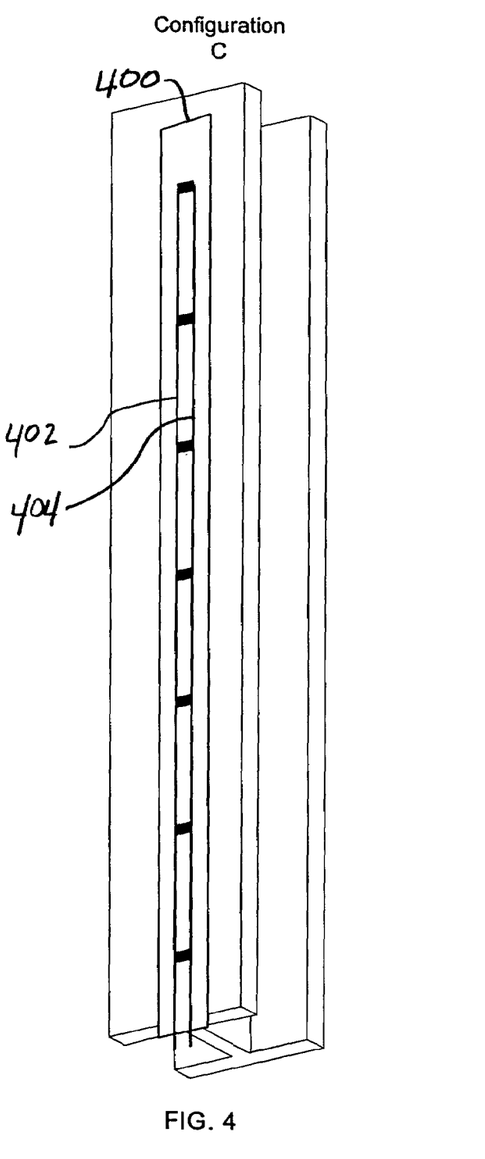
FIG. 4 is an illustration of a temperature monitoring tape having a third configuration (configuration C) of conductive traces deposited thereon.

FIG. 4 is a diagram of another arrangement 400 of the conductive traces deposited on tape 100. Arrangement 400 includes a common first connection strip 402 and a common second connection strip 404 spaced apart from first connection strip 402 along the length of tape 400. Tape 400 also includes multiple temperature sensitive bands connected between common first and second connection strips 402, 404 at graduated positions along the length of tape 400. Arrangement 400 is advantageously monitored using a TDR device connected to the ends of connection strips 402, 404. The TDR applies electrical pulses to the ends of the strips 402, 404 and monitors reflected or return pulses. Using this technique, the TDR device detects anomalies, i.e., either short or open-circuits, at bands 126. In addition, the TDR can determine a distance to the detected anomaly based on a delay between the transmitted and reflected pulses. The distance corresponds to a position of the anomaly on the structure to which the bands are attached.

Figure 5:
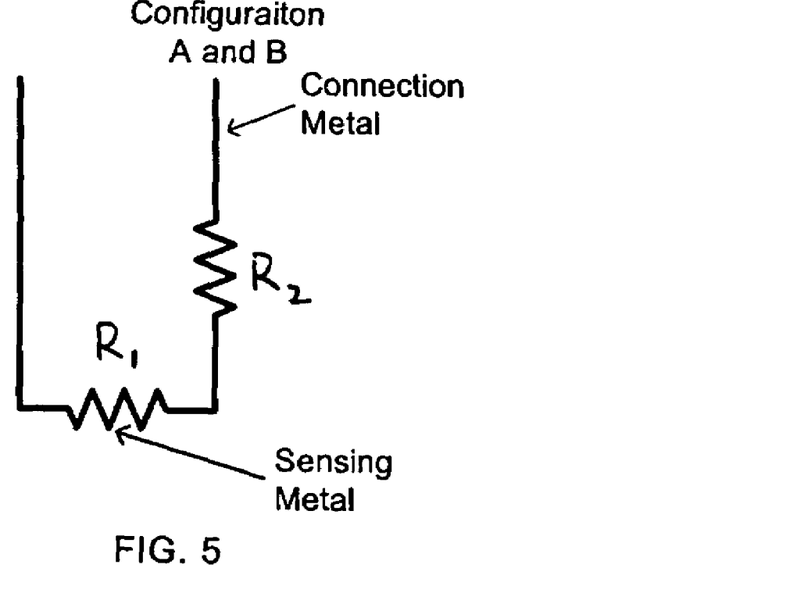
FIG. 5 is an equivalent circuit diagram corresponding to the conductive trace configurations of FIGS. 2 and 3.
Figure 6:
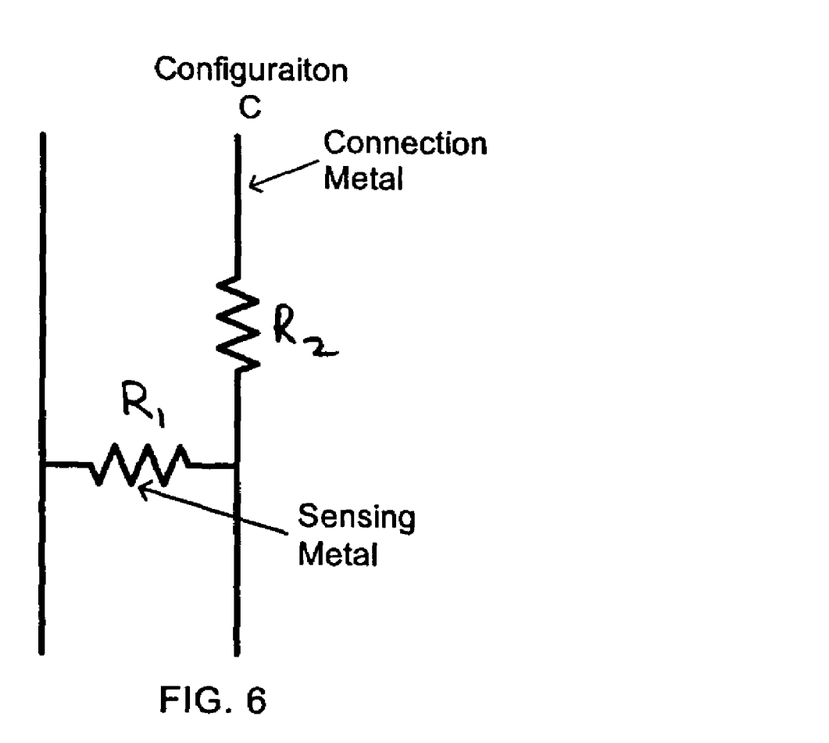
FIG. 6 is an equivalent circuit diagram corresponding to the conductive trace configuration of FIG. 4.

FIG. 5 is an equivalent circuit diagram corresponding to the conductive trace arrangements depicted in FIG. 2 and FIG. 3. R1 represents a resistance of temperature sensitive band 126 in these arrangements. A resistance R2 represents the resistance of the first and second connection strips in each of these arrangements. FIG. 6 is an equivalent circuit diagram corresponding to the arrangement of FIG. 4.

Figure 7:
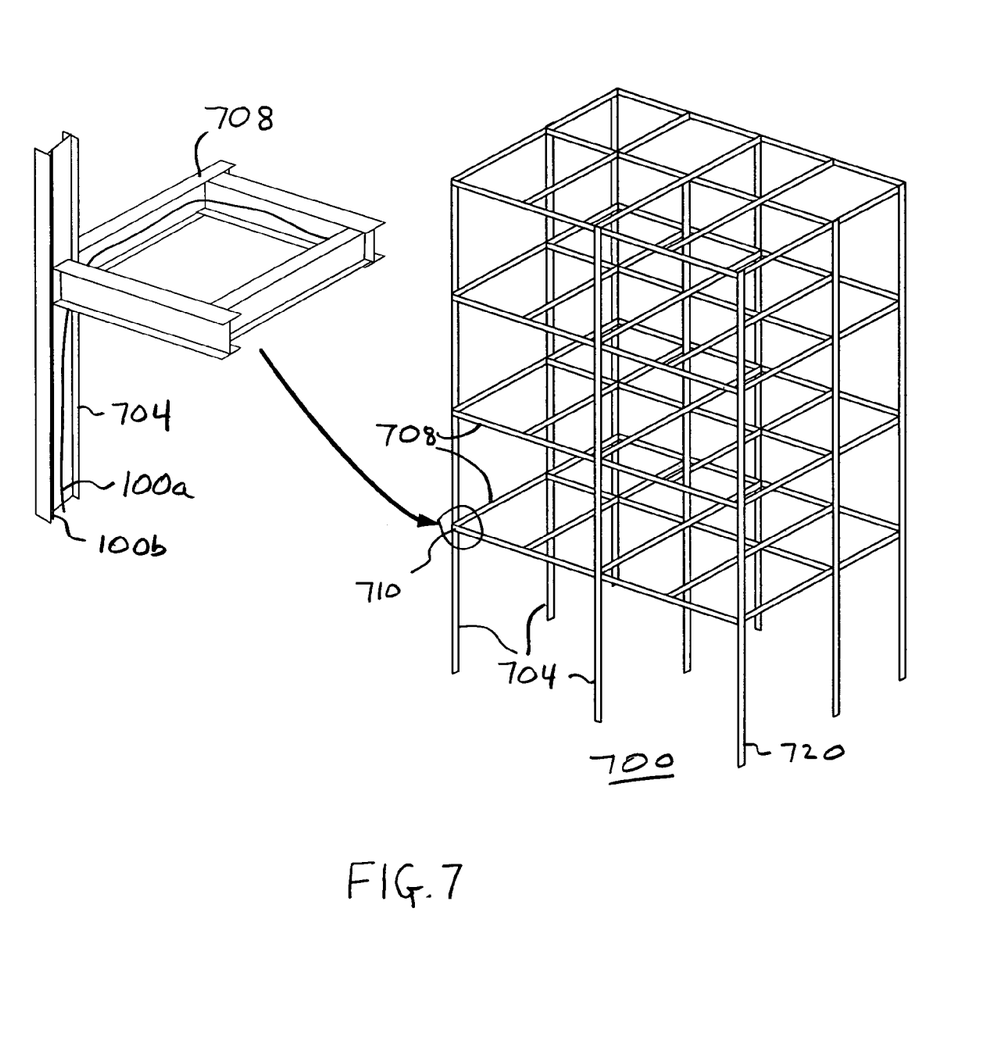
FIG. 7 is a diagram of an example edifice support structure configured to have its temperature monitored using the present invention.

FIG. 7 is a diagram of an example edifice support structure 700 configured to have its temperature monitored using the present invention. Edifice structure 700 supports a multi-story building and includes vertical support beams 704 and horizontal support beams 708 configured as cells to support a multi-story building. Depicted in exploded-view at the left-hand side of FIG. 7 is a corner 710 of structure 700. A series of tape strips 206a-206n each carrying multiple channels 120 are affixed to corresponding support beams 704, 708 throughout the structure. The series of tape strips 206 can run the height and breadth of structure 700 along the various vertical and horizontal beams 704, 708. The multiple tape strips, and thus their channels 120, come together at a common monitoring point 720 near the base of the structure, for example. This monitoring configuration utilizes as many tape strips and channels as are necessary to adequately monitor the temperatures of the various structural members of structure 700.

Figure 8:
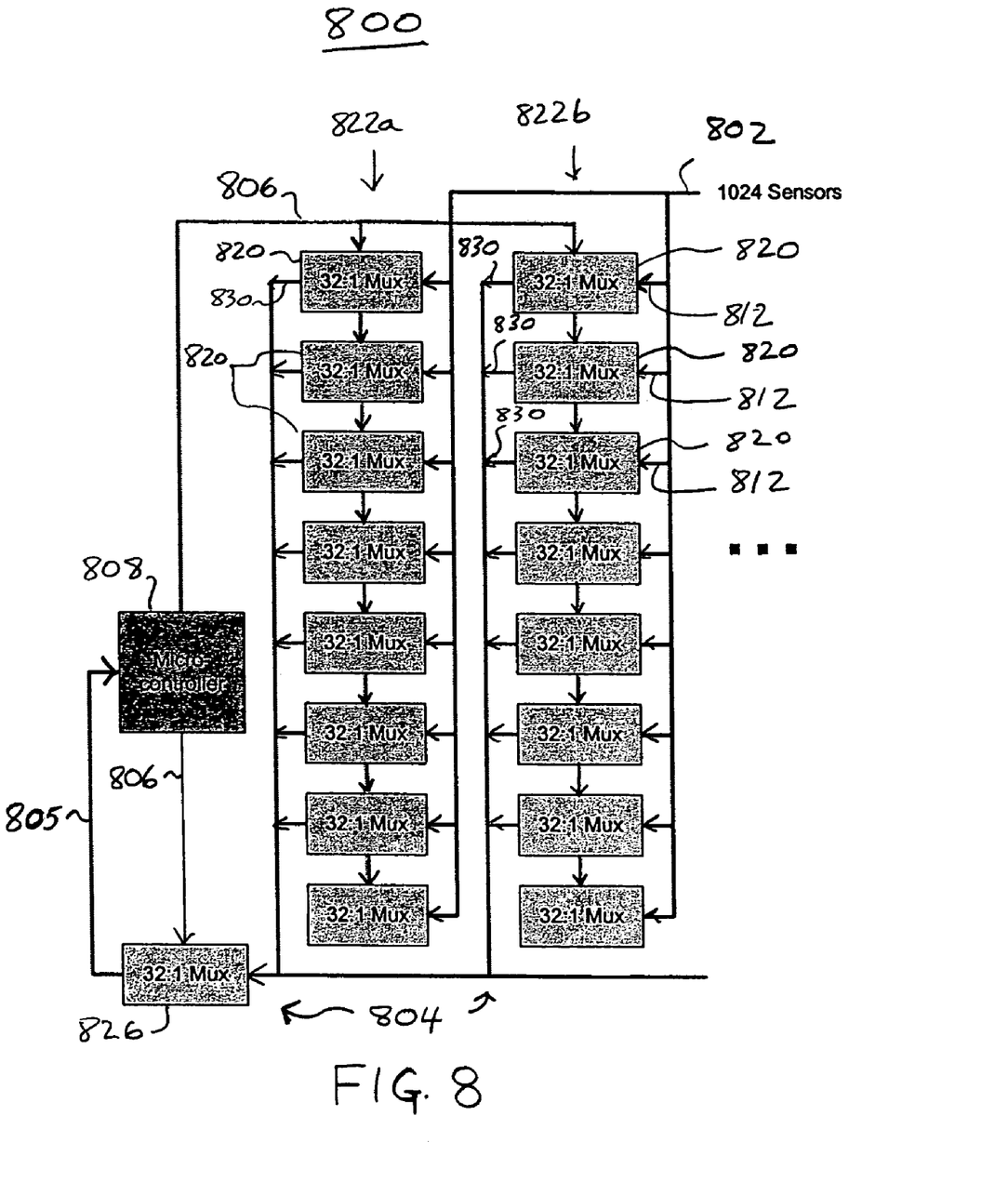
FIG. 8 is a block diagram of an apparatus configured to monitor a large number of conductive channels (e.g., as depicted in any of FIGS. 1-4) spanning multiple tape strips affixed to supports in a structure.

FIG. 8 is a block diagram of a monitor 800 configured to monitor a large number of channels 802, comprising groups of channels 120, spanning multiple tape strips affixed to supports in a structure, such as beams 704, 708 of structure 700. Monitor 800 is situated at a common meeting point for the multiple tape strips, and thus channels 802. Monitor 800 includes a channel multiplexer module 804 that receives channels 802 and selects a channel 805 from among the channels, responsive to control signals 806 from a controller 808. Controller 808 monitors selected channel 805 for an open-circuit. Controller 800 asserts control signals 806 so as to serially poll over time each of channels 802, presented to controller 808 as channel 805.

At the common meeting point, multiple channels 802 separate or split into different groups 812 of channels. Multiplexer module 804 includes multiplexers 820 arranged in columns or groups 822a, 822b, and so on, and a final output multiplexer 826. Each channel group 812 feeds the inputs of a corresponding one of column multiplexers 820. Responsive to control signals 806, each column multiplexer 820 selects a channel 830 from among the channels in channel group 812 feeding that multiplexer. Multiple selected channels 830 feed the inputs of final multiplexer 826. Responsive to control signals 806, final multiplexer 826 selects channel 805 from among multiple selected channels 830, and provides the finally selected channel 805 to controller 808. Controller 808 includes circuit testers as described in connection with FIG. 2 for monitoring for failures in channel 805.

Figure 9:
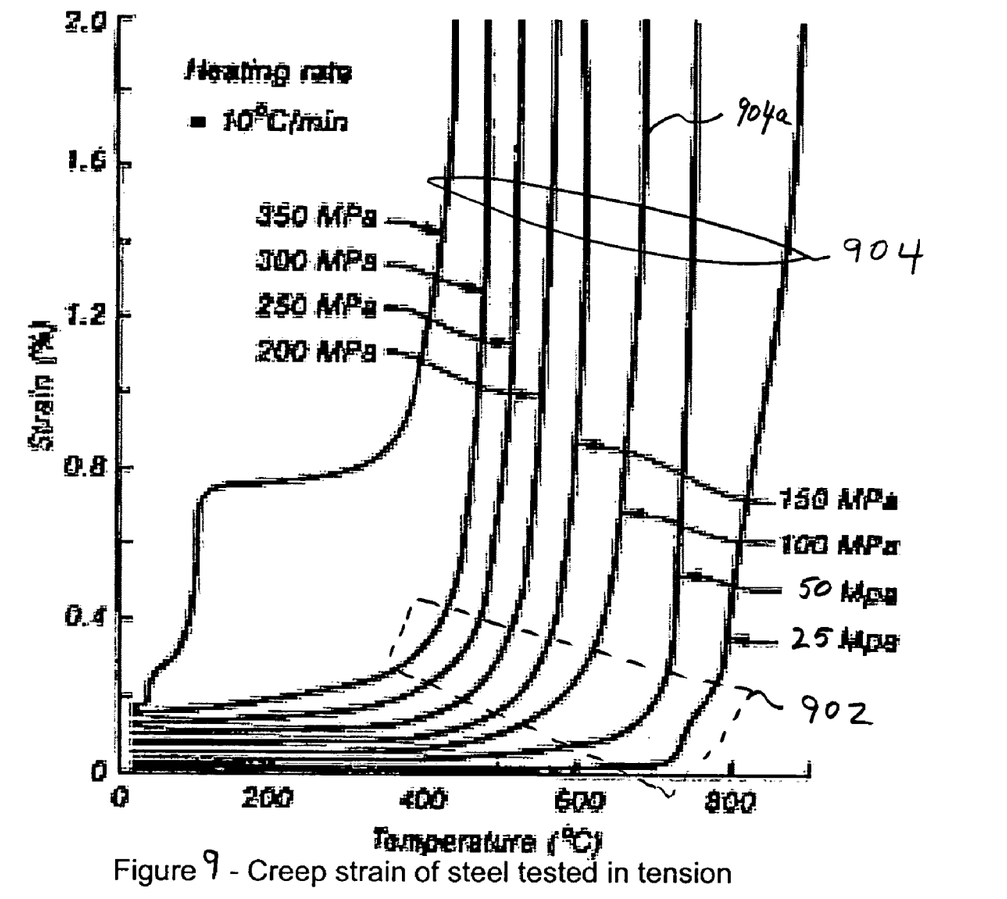
FIG. 9 is a series of strain vs. temperature plots for a steel member, by Kirby and Preston (1988), that relate mechanical loading of the steel member to temperatures at which the steel member experiences critical structural failure.

FIG. 9 is a series of plots 904 by Kirby and Preston (1988) that relate mechanical loading of a structure to temperatures at which the structure experiences critical structural failure. As will become apparent from the ensuing description, plots 904 reveal the importance of considering the mechanical loading of a structure when selecting a metal composition for, and thus melting point of, bands 126.

Plots 904 are strain vs. temperature curves that collectively represent results of a series of tension experiments that included measuring the stretching (i.e., strain) of a steel sample while (i) mechanically loading the steel sample with different constant forces (i.e., engineering stresses), and concurrently (ii) heating the steel sample at a constant rate (10° C./min.). Each of curves 904 represents a different constant mechanical load level, and indicates at a knee point 902 on the curve a critical temperature for catastrophic failure of the steel sample caused by tensile creep rupture. Such rupture results in runaway deflection, buckling and even tearing of the steel sample. Curves 904 indicate that the failure temperature of the steel sample is highly dependent on the magnitude of the load applied to the sample (i.e., loading condition). For example, from the curves, it is seen that a higher mechanical load causes the onset of a catastrophic failure at a lower temperature than does a lower mechanical load.

As an example, curve 904a indicates that at a given constant load of 100 MPa, the steel sample starts to stretch rapidly at about 400° C., and catastrophic failure occurs near 650° C. Curve 904a indicates that the steel sample stretches "rapidly" above 400° C. because temperature and time are proportionately equivalent given the constant heating rate (e.g. a 400 degree temperature change occurs over an elapsed time of 40 minutes). Therefore, the slope of curve 904a is proportionately equivalent to the strain rate (dstrain/dtime).

As described above, the present invention monitors the temperature of a structural support to which it is attached. Specifically, the invention indicates when the structural support reaches a temperature sufficiently high to melt temperature sensitive band 126. Preferably, the invention indicates when the support is near its failure temperature. For the invention to operate in this manner, the melting point of band 126 applied to the structural support, needs to be near, and preferably slightly below, the failure temperature of the structural support.

However, as discussed above, the failure temperature is not a constant, but rather varies as a function of the mechanical load applied to the support. That is, supports carrying different loads have different corresponding failure temperatures. Therefore, the present invention contemplates the use of bands 126 having different compositions, and thus different melting points, matched to or indicative of the different failure temperatures. The following steps can be used to perform such matching to, and then monitoring of, a structural support or member:

(a) determining, e.g., by measuring, calculating, or otherwise, the mechanical loading of a given support member in a support structure;

(b) determining, e.g., from a strain vs. temperature plot, the failure temperature or a range of failure temperatures of the support based on the determined mechanical loading; and (c) selecting a tape including bands 126 having melting points matched to (e.g., near, below or in the range of) the determined failure temperature. This includes selecting a metal composition, having a matched melting point, for band 126;

(d) applying a tape having the selected composition for band 126 to the support; and (e) monitoring channels of the applied tape in the manner described above in connection with FIGS. 2 and 8, for example.

In an example, it can be seen from FIG. 9 that for a wide range of mechanical loads, the steel member becomes ductile between 400° C. and 600° C. Thus, a good choice of the composition of band 126 would be a zinc alloy having a melting point near 410° C. One having skill in the relevant art(s) of metallurgy would be able to identify suitable electrically conductive metal compositions, including zinc, copper, tin and aluminum alloys, for example, having matched melting points given the present description.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. An apparatus for monitoring a temperature of a structure, comprising:
   one or more electrically conductive loops adapted to be affixed to the structure, each including
      first and second elongate connection strips each made of a first metal composition having a first melting point, and
      a temperature sensitive band connected between the first and second connection strips and made of a second metal composition having a second melting point less than the first melting point.

2. The apparatus of claim 1, further comprising a monitor, connected to respective ends of the first and second connection strips spaced-apart from the temperature sensitive band, configured to detect an open-circuit in the one or more electrically conductive loops caused when the temperature sensitive band separates from either of the connection strips.

3. The apparatus of claim 1, wherein the one or more electrically conductive loops includes multiple conductive loops each electrically isolated from the other, and each having:
   first and second connection strips; and
   a temperature sensitive band connected between the first and second connection strips and spaced-apart from the other temperature sensitive bands.

4. The apparatus of claim 1, wherein the one or more conductive loops include multiple conductive loops, the multiple conductive loops including:
   a common first connection strip;
   multiple temperature sensitive bands respectively connected to the common first connection strip at graduated positions there along; and
   multiple second connection strips each connected to a respective one of the sensitive bands.

5. The apparatus of claim 1, wherein the first metal composition is a composition including one of aluminum and copper.

6. The apparatus of claim 1, wherein the second metal composition is a composition including one of a zinc alloy, lead and tin.

7. The apparatus of claim 1, wherein the second metal composition has a melting point below about 450° C.

8. The apparatus of claim 7, wherein the second metal composition has a melting point in the range of about 200° C. to 450° C.

9. The apparatus of claim 1, wherein the first metal composition has a melting point above about 650° C.

10. The apparatus of claim 1, wherein the one or more electrically conductive loops form part of a flexible tape adapted to be formed into a roll, the tape including:
    a carrier layer configured to be affixed to the structure; and
    an electrically insulating layer overlaying the carrier layer,
    wherein the one or more electrically conductive loops overlay the electrically insulating layer.

11. The apparatus of claim 1, wherein the structure includes steel and the second melting point is a temperature sufficiently high to cause a structural failure of the steel when under a mechanical load.

12. An apparatus for monitoring a temperature of a structure, the structure including multiple structural components, comprising:
multiple strips of tape each affixed to a corresponding one of the structural components, each tape strip carrying thereon one or more electrically conductive loops, each of the one or more electrically conductive loops including
first and second spaced-apart elongate connection strips each extending along a length of the tape strip and each made of a first metal composition having a first melting point, and
a temperature sensitive band connected between the first and second connection strips, the temperature sensitive band made of a second metal composition having a second melting point less than the first melting point; and
a monitor, connected to the first and second connection strips of each of the electrically conductive loops, configured to detect an open-circuit in the electrically conductive loops caused when the temperature sensitive band separates from either the first or second connection strip.

13. The apparatus of claim 12, wherein the multiple structural components include steel and the second melting point is a temperature sufficiently high to cause a structural failure of the steel when under a mechanical load.

14. A temperature sensitive tape, comprising:
a flexible carrier having a length greater than a width thereof and being adapted to be wound into a roll;
an electrically insulating layer overlaying a surface of the carrier;
one or more electrically conductive loops overlaying the electrically insulating layer, the one or more electrically conductive loops including
first and second spaced-apart elongate connection strips each extending along at least a portion of the length of the carrier, and each made of a first metal composition having a first melting point, and
a temperature sensitive band connected between the first and second connection strips and made of a second metal composition having a second melting point less than the first melting point.

15. The tape of claim 14, further comprising:
a pressure sensitive adhesive layer underlying the flexible carrier.

16. The tape of claim 14, wherein the one or more electrically conductive loops include multiple conductive loops extending along the length of the carrier and spaced-apart from each other across the width of the carrier, the multiple conductive loops having respective lengths graduated along the length of the carrier such that the temperature sensitive bands are spaced-apart from each other along the length of the carrier.

17. The tape of claim 14, wherein the one or more electrically conductive loops include multiple conductive loops, the multiple conductive loops including:
a common first elongate connection strip;
multiple temperature sensitive bands respectively connected to the common first connection strip at graduated positions there along; and
multiple second elongate connection strips each connected to a respective one of the sensitive bands.

18. The tape of claim 14, wherein the second metal composition has a melting point below about 450° C.

19. The tape of claim 18, wherein the first metal composition has a melting point above about 650° C.

20. The apparatus of claim 14, wherein the first metal composition is a composition including one of aluminum and copper.

21. The apparatus of claim 14, wherein the second metal composition is a composition including one of a zinc alloy, lead and tin.

22. The apparatus of claim 14, wherein the second melting point is at least 200° C. less than the first melting point.

23. A method of monitoring an integrity of a structure, comprising:
affixing to the structure one or more electrically conductive loops each including
first and second connection strips each made of a first metal composition having a first melting point, and
a temperature sensitive band connected between the first and second connection strips and made of a second metal composition having a second melting point less than the first melting point; and
monitoring for an open-circuit in the conductive loop caused when the temperature sensitive band separates from either the first or second connection strip responsive to a heating of the structure.

24. The method of claim 23, wherein said monitoring step comprises:
applying a signal to an end of one of the connections strips; and
monitoring for an absence of the signal at an end of the other one of the connection strips.

25. A method of monitoring a support member in a support structure for destructively high temperatures thereof, comprising:
(a) determining a mechanical loading of the support member in the support structure;
(b) determining a failure temperature of the support member based on the determined mechanical loading;
(c) selecting a temperature monitoring apparatus including an electrically conductive loop having a temperature sensitive band thereof configured to melt at a first temperature that is equal to or below the failure temperature, and thereby cause an open-circuit in the electrically conductive loop at the failure temperature;
(d) affixing the electrically conductive loop to the support member; and
(e) monitoring the affixed electrically conductive loop for an occurrence of an open-circuit therein.

26. The method of claim 25, wherein step (b) comprises determining the failure temperature of the support member based on the determined mechanical loading and a strain versus temperature plot for the support member.

* * * * *